United States Patent [19]
Waineo

[11] Patent Number: 4,936,438
[45] Date of Patent: Jun. 26, 1990

[54] CONVEYOR LOADING AND UNLOADING APPARATUS

[75] Inventor: Glenn Waineo, Canton Township, Wayne County, Mich.

[73] Assignee: Welduction Automation Inc., Livonia, Mich.

[21] Appl. No.: 200,713

[22] Filed: May 31, 1988

[51] Int. Cl.⁵ ............................................. B65G 37/00
[52] U.S. Cl. ................................ 198/468.6; 198/465.4
[58] Field of Search ............... 198/468.6, 486.1, 465.4, 198/485.1; 414/749

[56] References Cited

U.S. PATENT DOCUMENTS

| | | | |
|---|---|---|---|
| 4,411,586 | 10/1983 | Zitser et al. .................. | 198/468.6 X |
| 4,727,976 | 3/1988 | Tsuchiya et al. ............ | 198/468.6 X |

FOREIGN PATENT DOCUMENTS

| | | | |
|---|---|---|---|
| 0012442 | 6/1980 | European Pat. Off. ......... | 198/468.6 |
| 271910 | 3/1914 | Fed. Rep. of Germany ... | 198/468.6 |
| 0002956 | 1/1977 | Japan ................................. | 198/468.6 |
| 0403614 | 10/1973 | U.S.S.R. ........................... | 198/465.4 |
| 0580148 | 11/1977 | U.S.S.R. ........................... | 198/485.1 |

Primary Examiner—David A. Bucci
Assistant Examiner—Cheryl L. Gastineau
Attorney, Agent, or Firm—Charles W. Chandler

[57] ABSTRACT

Apparatus useful for either loading or unloading a workpiece carried on a C-shaped carrier of a conveyor. The base of the carrier has a pair of spaced legs on which the workpiece is carried. The loading apparatus includes a carriage that is moveable along a pair of guide bars toward and away from the path of motion of the carrier. A cradle supports the workpiece and is carried on the carriage so as to be received between the legs of the carrier for loading the workpiece. The loading apparatus includes a pair of motors. One is connected to the carriage to move it in a reciprocating, horizontal, harmonic motion. The second motor is mounted on the carriage so as to be moved with it in the horizontal motion. The second motor is connected to the cradle to move it in a vertical, harmonic motion. The two motors are energized in an alternating manner so that the cradle is moved in a rectangular, path of motion and synchronized with the conveyor carrier.

12 Claims, 3 Drawing Sheets

CONVEYOR LOADING AND UNLOADING APPARATUS

BACKGROUND OF THE INVENTION

This invention is related to an improved loading or unloading apparatus for a monorail conveyor in which a workpiece-supporting cradle is advanced and returned in a rectangular path of motion, and moved in a harmonic rate of motion along each leg of the four-sided path.

Monorail conveyors are commonly used for moving a workpiece between work stations, and usually include a "C" shaped carrier. The upper end of the conveyor is driven by a chain drive and advanced on rollers along a track. The base of the carrier is adapted to pick-up and support the workpiece. It is desirable to load and unload a workpiece, such as a metal stamping, in a relatively soft manner so that it is not damaged. However, this requires loading and unloading the workpiece in a relatively slow motion which increases the overall cycle time. Further, space is sometimes a limiting factor for the loading and unloading apparatus.

SUMMARY OF THE INVENTION

The broad purpose of the present invention is to provide an improved monorail conveyor having a novel workpiece carrier. In the preferred embodiment of the invention, the carrier has a generally "C" shaped configuration with upper structure adapted to be connected to the monorail track in the usual manner, while the base of the carrier has a pair of spaced, horizontal legs forming a laterally facing opening for receiving the cradle of a workpiece loading or unloading apparatus while the carrier is being advanced along the monorail track.

Another object of the invention is to provide an improved apparatus for either loading or unloading a monorail conveyor.

The loading apparatus includes a cradle on which the workpiece is carried for either loading or unloading the conveyor carrier. The cradle is carried on a carriage slideably mounted on a pair of horizontal guide rods. The carriage is reciprocated along the guide rods toward and away from the conveyor path. The carriage supports a motor having a bell crank connected by a pair of reciprocating rods to the cradle for raising and lowering it in a harmonic motion. Thus, the vertical motion of the cradle is slow at the beginning of a stroke, increases in speed and then slows at the end of its stroke.

A second motor is connected by a novel crank to the carriage for reciprocating it in a harmonic motion in a horizontal direction.

The two motors, in alternating cycles, move the cradle in a rectangular path of motion. When the carriage is spaced from the conveyor, the first motion raises the cradle in a harmonic motion, the second motor then moves it toward the conveyor along a horizontal path of motion. When the cradle is within the carrier opening, the first motor lowers the cradle to deposit the workpiece on the base of the carrier. When the cradle is lowered to clear the carrier, the cradle is then moved horizontally in a return stroke to complete the fourth leg of the circuit.

When the apparatus is employed as a unloading device, the cycle is reversed so that the cradle is moved to a position beneath the carrier base, raised to unload the workpiece and then moved away from the carrier in its return stroke.

Another object of the invention is to provide a novel form of crank for converting the rotary motion of a motor to the reciprocating, linear motion of the carriage. The preferred embodiment of the invention includes an elongated crank having one end connected to the output shaft of a motor reducer. The opposite end of the crank has a pivot member. Preferably a chain sprocket is fixed to the reducer housing so that the sprocket teeth are disposed about the axis of rotation of the crank. The pivot member supports a smaller sprocket. A chain is mounted on the two sprockets in such a manner that as the crank is rotated by the motor, the pivot and the smaller sprocket are moved in an orbit around the axis of rotation of the crank, and the chain rotates the pivot member with respect to the crank.

A lever having one end connected to the pivot member and its opposite end connected to the carriage, is adapted to move the carriage in a reciprocating motion as the crank is being rotated. As the crank is being rotated, the lever and the crank alternately fold and unfold. One advantage of such an arrangement is that the chain provides a positive mechanical means for ensuring that the lever will always rotate in the opposite direction with respect to the crank.

Still another advantage of the preferred loading apparatus is that it reduces the dwell time for either picking up or unloading a workpiece. The apparatus also reduces the overall cycle time because the loading apparatus operates at a variable velocity, slowing down only at the end of each leg of its path of motion. The apparatus achieves this type of motion employing a constant speed rotary drive.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
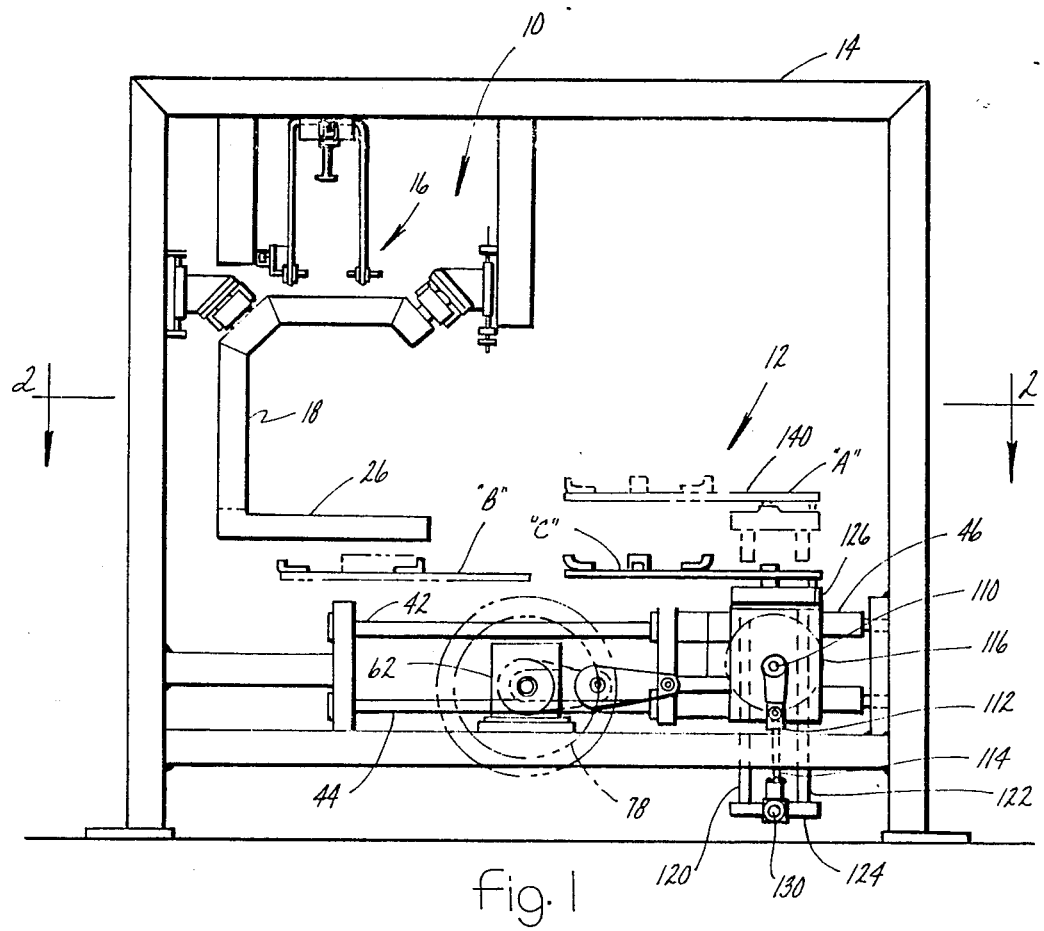
FIG. 1 is an elevational transverse view of a conveyor and loading apparatus illustrating the preferred embodiment of the invention.
Figure 6:
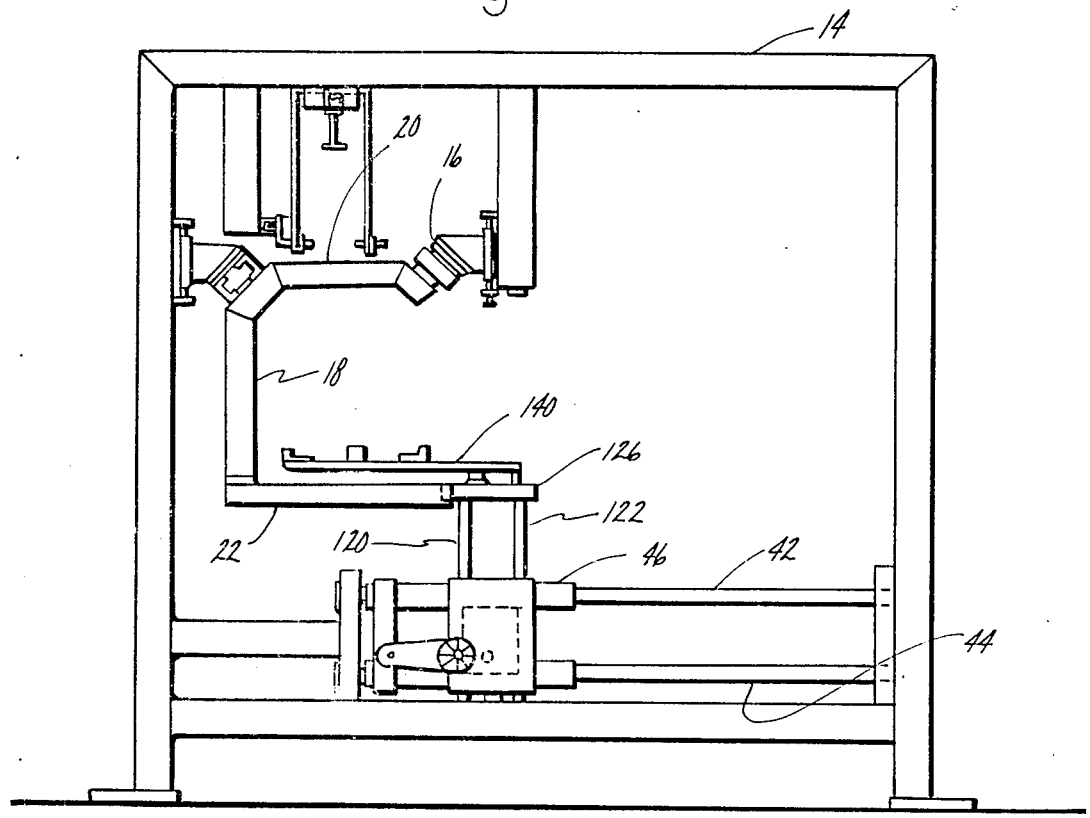
FIG. 6 is a view similar to FIG. 1 but showing the carriage at the opposite end of its stroke.

FIGS. 1 and 6 illustrate a conveyor apparatus, generally indicated at 10, and a loading apparatus 12 mounted on frame 14.

Monorail chain drive means generally indicated at 16 is relatively conventional and is well known to those skilled in the art.

Figure 4:
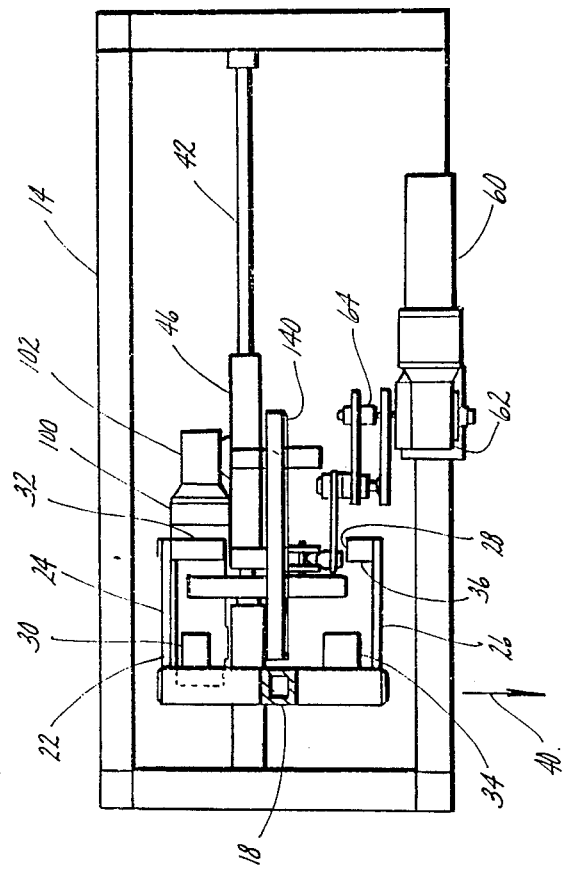
FIG. 4 is a view similar to FIG. 2 but showing the carriage at the opposite end of its stroke.
Figure 3:
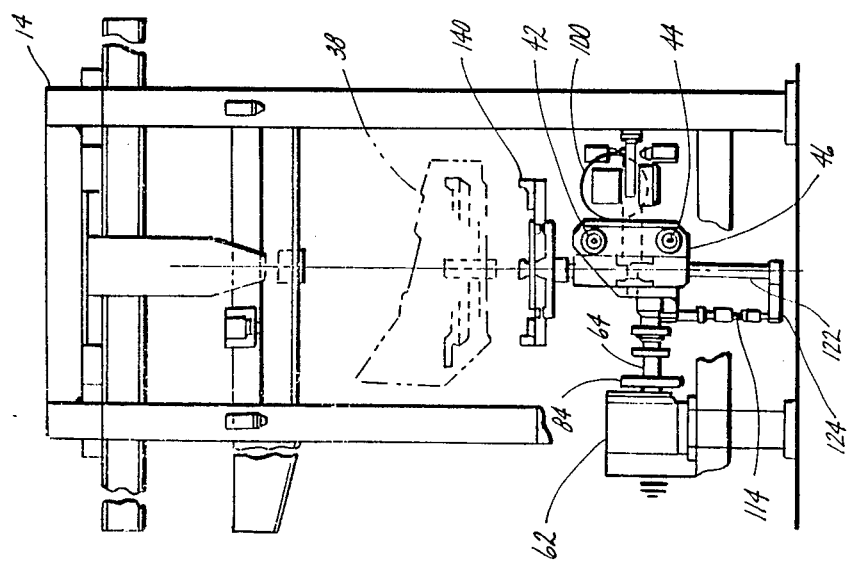
FIG. 3 is a view as seen from the right side of FIG. 1.

The conveyor employs a generally "C" shaped workpiece carrier 18. The carrier has upper structure 20 connected in the usual manner to the monorail drive means, and lower structure 22 including a pair of horizontally spaced legs 24 and 26, as illustrated in FIG. 4. The two legs define an opening 28. The lower structure has pad means 30, 32, 34 and 36 adapted to support a workpiece 38, as illustrated in FIG. 3. The workpiece spans the opening between the legs when mounted on the pads.

Referring to FIG. 4, the conveyor carrier is adapted to be moved in a linear path of motion generally indicated at 40.

Referring to FIG. 1, loading apparatus 12 comprises a pair of horizontal guide bars 42 and 44. The two guide bars have a generally identical length and are supported one above the other in a direction at right angles to the path of motion 40 of conveyor carrier 18.

A carriage 46 is slideably mounted on the two guide bars.

Referring to FIG. 4, DC motor 60 is connected to a gear reducer 62, and mounted on base 14. Motor 60 may also be an AC motor, a hydraulic or a pneumatic power means. The gear reducer has rotary output shaft 64.

Figure 5:
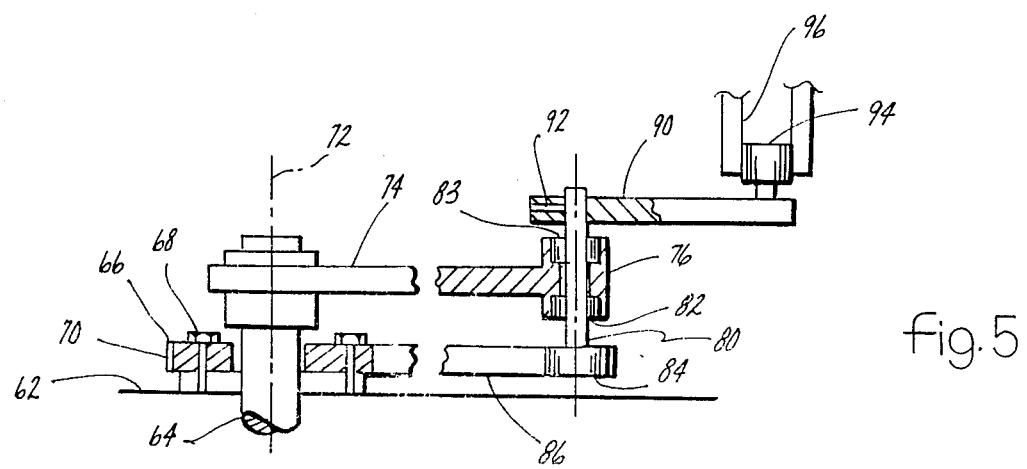
FIG. 5 is a fragmentary view of the crank apparatus mounted on the carriage drive means.

Referring to FIGS. 1, 4 and 5, a chain sprocket 66 is attached by fastening means 68 on the gear reducer housing such that the annular array of teeth 70 on the sprocket are disposed about the axis of rotation 72 of output shaft 64.

An elongated crank 74 has one end attached to output shaft 64 so that the opposite end 76 travels in an orbit 78, about axis 72. A pivot member 80 is rotatably mounted by bearing means 82 and 83 on the crank. A second, smaller chain sprocket 84 is carried on one end of the pivot to rotate with it. A continuous chain 86 is mounted on sprockets 66 and 84 in such a manner that as the crank is rotated by output shaft 64, the pivot member travels in the orbit of the outer end of the crank. The chain causes sprocket 84 to rotate with the pivot member. Preferably the relationship between the teeth of the two sprockets is 2:1 with sprocket 66 having the greater number.

A lever 90 is fastened by fastener 92 on the opposite end of the pivot member. The lever thus rotates with the pivot member and sprocket 84. A cam follower 94 is carried on the other end of the lever and mounted in a horizontal channel 96 carried on carriage 46. The arrangement is such that as output shaft 64 is rotated, crank 74 rotates with the shaft. The outer end of the crank then moves lever 90, alternately pulling and pushing the carriage in a harmonic motion during the course of a horizontal stroke. Further, there is always a mechanical connection between lever 90 and the crank which prevents the lever from collapsing as the crank and the lever are folded parallel to one another. Thus, as the crank is moved in a counterclockwise direction with respect to shaft 64 as viewed in FIG. 1, the lever will always be moved in the clock-wise direction with respect to the crank.

The two sprockets and the chain can be replaced by a gear train in which one gear is fastened to the housing of the gear reducer, a second gear carried on the end of the pivot member, and an intermediate gear meshed between the two outer gears. Thus, the rotary motion of output shaft 64 is converted to a reciprocating motion of the carriage on guide bars 42 and 44.

Referring to FIGS. 1 and 3, a second motor 100 and gear reducer 102 are mounted on carriage 46. The gear reducer has an output shaft 110. Shaft 110 carries a crank 112 which in turn is pivotally connected to arm 114. The outer end of the crank 112 travels in an orbit 116.

A pair of vertical guide bars 120 and 122 are slideably mounted on the carriage. A lower yoke plate 124 is attached to the lower ends of the two guide bars, and an upper yoke plate 126 is attached to the upper ends of the two guide bars.

Pivot means 130 connect the lower end of arm 114 to the lower yoke plate in such a manner that as shaft 110 is rotated, the yoke plate and the two guide bars are reciprocated in a vertical harmonic motion.

Figure 2:
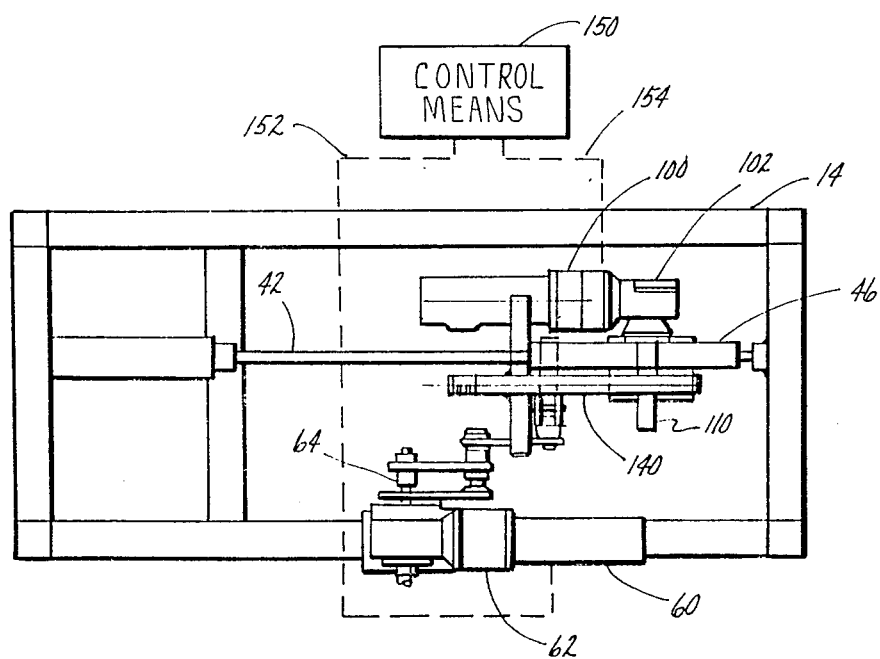
FIG. 2 is a view generally as seen along lines 2-2 of FIG. 1, with the conveyor carrier removed for descriptive purposes.

A cradle 140, adapted to accommodate the configuration of workpiece 38, is attached to yoke 126. Referring to FIGS. 1 and 6, cradle 140 is reciprocated between a lower position illustrated in FIG. 1, and an upper position illustrated in FIG. 6. The cradle is also moveable between a left position, as illustrated in FIGS. 1 and 4, in which it passes within the opening of the conveyor carrier, and a retracted position, illustrated in FIG. 2, in which the cradle is spaced from the conveyor carrier.

Control means 150 are electrically connected by means 152 and 154 to the two motors to energize them in a programmed sequence.

For purposes of a loading sequence, the cradle starts in position "C" in FIG. 1. Workpiece 38 is staged by a supply conveyor or other means. The cradle is then moved vertically by motor 100 to position "A". The cradle is then moved by motor 60 toward the advancing conveyor carrier to the position illustrated in FIG. 6. Motor 60 is de-energized and motor 100 energized to lower the cradle, depositing the workpiece on the base of the carrier structure. The cradle is moved in a harmonic motion to the lower position, illustrated in phantom in FIG. 1 at "B", in which the cradle clears the path of motion of the conveyor. Motor 100 is de-energized and motor 60 energized to move the cradle toward the right to position "C", illustrated in solid lines in FIG. 1.

When the loading apparatus is being employed as an unloading apparatus, the height of frame 14 may be adjusted to accommodate the height of the conveyor carrier, and the rectangular path of motion reversed to unload the workpiece from the conveyor carrier, that is, the cradle raises the workpiece and moves it toward the right, as viewed in FIG. 1.

Thus, it is to be understood that I have described an improved conveyor carrier, an improved loading and unloading apparatus, and an improved bell crank apparatus.

Having described my invention, I claim:

1. Conveyor apparatus for moving a workpiece comprising:
   an overhead track means;
   a workpiece carrier having an upper structure connected to the overhead track means for movement along a first path of motion, the workpiece carrier having a lower structure connected to the upper structure for movement therewith, the lower carrier structure including a pair of horizontally spaced legs (24, 26) defining an opening (28) between them facing in a lateral direction with respect to said first path of motion, the legs being adapted to support a workpiece that spans the opening between the legs;
   a loading member for supporting a workpiece; and
   power means for moving the loading member in a horizontal direction toward the path of motion of the workpiece carrier, and in a vertical direction in which the loading member passes between the horizontally spaced legs of the lower structure of the carrier for depositing the workpiece on the legs, said power means being operative to move the loading member in reverse, horizontal and vertical directions for removing a workpiece mounted on said legs.

2. A combination as defined in claim 1, in which the lower carrier structure resembles a U-shaped base having a pair of spaced legs, and including pad means on said legs for receiving a workpiece which spans said legs.

3. A combination as defined in claim 1, in which the loading member is moveable in a generally harmonic rate of motion with respect to said carrier.

4. Apparatus as defined in claim 1, in which the power means and the loading member are useful for either loading or unloading a workpiece from the conveyor carrier, and include:
   a base;
   elongated guide means mounted on the base;
   a carriage mounted on the guide means so as to be moveable therealong;
   first power means mounted on the base and connected to the carriage for moving it in a reciprocating motion on the guide means;
   workpiece cradle mounted on the carriage;
   a second power means mounted on the carriage and connected to the workpiece cradle for moving it in a reciprocating motion with respect to the carriage;
   whereby the workpiece cradle is moveable along a multi-sided path of motion according to the motion of the first and second reciprocating power means, said multi-sided path of motion passing between the legs of said carrier lower structure.

5. A combination as defined in claim 4, in which the first power means is operative to move the carriage in a generally horizontal motion, and the second power means is operative to move the carriage in a generally vertical motion.

6. A combination as defined in claim 4, in which the first and second power means are operative to alternately move the carriage, along their respective paths of motion.

7. A combination as defined in claim 6, in which the first and second power means cooperate to move the carriage in a rectangular path of motion.

8. A combination as defined in claim 4, in which the second power means comprises a rotary power device having a rotary output shaft, slide means mounted on the carriage and supporting the carriage for a vertical motion, and crank means connected between the output shaft and the slide means for reciprocating same as the output shaft is being rotated.

9. A combination as defined in claim 8, in which the means connecting the second power means to the carriage includes a bell crank.

10. A combination as defined in claim 4, in which the first power means comprises:
    a power device having an output shaft rotatable about a first axis;
    a crank having first and second ends;
    means connecting the first crank end to the output shaft;
    a pivot member carried on the second end of the crank so as to be rotatable therewith;
    a first toothed member having an annular array of teeth, and means for mounting the first toothed member such that the array of teeth are fixed with respect to the output shaft;
    a second toothed member mounted on the pivot member so as to be rotatable therewith, means connecting the second toothed member to the first toothed member such that the second toothed member is moved in an orbit about said first axis as the crank is being rotated with the output member;
    a lever having a first and second opposite ends, means for connecting the first end of the lever to the pivot member such that the lever is pivoted with respect to the crank as the crank is being rotated; and
    means so connected to the second end of the lever that it moves in a generally linear path of motion as the output shaft is being rotated.

11. A combination as defined in claim 10, in which the first toothed member and the second toothed member comprise a first chain sprocket and a second chain sprocket, and including chain means mounted on the first and second chain sprockets.

12. A combination as defined in claim 11, in which a number of teeth on the first and second chain sprockets are in a 2:1 ratio.

* * * * *